United States Patent
Piol et al.

(10) Patent No.: US 9,651,457 B2
(45) Date of Patent: May 16, 2017

(54) METHOD FOR DETECTING DETERIORATION IN A TURBOMACHINE BY MONITORING THE PERFORMANCE OF SAID TURBOMACHINE

(71) Applicant: SNECMA, Paris (FR)

(72) Inventors: Olivier Piol, Montigny le Bretonneux (FR); Thierry Brichler, Paris (FR); Amaury Olivier, Boulogne-Billancourt (FR)

(73) Assignee: SNECMA, Paris (FR)

( * ) Notice: Subject to any disclaimer, the term of this patent is extended or adjusted under 35 U.S.C. 154(b) by 273 days.

(21) Appl. No.: 14/413,056

(22) PCT Filed: Jul. 3, 2013

(86) PCT No.: PCT/FR2013/051573
§ 371 (c)(1),
(2) Date: Jan. 6, 2015

(87) PCT Pub. No.: WO2014/009634
PCT Pub. Date: Jan. 16, 2014

(65) Prior Publication Data
US 2015/0192499 A1    Jul. 9, 2015

(30) Foreign Application Priority Data

Jul. 10, 2012   (FR) ...................... 12 56640

(51) Int. Cl.
| | |
|---|---|
| *G01M 15/14* | (2006.01) |
| *G05B 23/02* | (2006.01) |
| *F02C 9/00* | (2006.01) |

(52) U.S. Cl.
CPC ............ *G01M 15/14* (2013.01); *F02C 9/00* (2013.01); *G05B 23/0254* (2013.01); *F05D 2260/80* (2013.01)

(58) Field of Classification Search
CPC ... F02C 9/00; F05D 2260/80; G05B 23/0254; G01M 15/14
(Continued)

(56) References Cited

U.S. PATENT DOCUMENTS

| | | | |
|---|---|---|---|
| 6,832,205 B1 * | 12/2004 | Aragones ............... | G06Q 10/06 703/6 |
| 7,058,556 B2 * | 6/2006 | Desai ..................... | G05B 17/02 700/31 |

(Continued)

FOREIGN PATENT DOCUMENTS

EP    2 207 072 A2    7/2010

OTHER PUBLICATIONS

International Search Report issued Nov. 11, 2013 in PCT/FR2013/051573 Filed Jul. 3, 2013.

*Primary Examiner* — Freddie Kirkland, III
(74) *Attorney, Agent, or Firm* — Oblon, McClelland, Maier & Neustadt, L.L.P.

(57) ABSTRACT

A method for detecting degradation of a turbine engine by monitoring performance of the turbine engine, the turbine engine including plural functional modules, the method including: measuring plural physical parameters of the turbine engine to form a current performance index for the turbine engine; calculating plural degraded performance indices for the turbine engine, assuming that, for each degraded performance index, only one functional module of the turbine engine has degraded; calculating plural cost indices corresponding to the difference between the current performance index and a degraded performance index; determining an optimum cost index corresponding to the one with a lowest value for all the degraded performance indices; and detecting degradation of the module of the turbine (Continued)

engine, the degraded performance index of which is associated with optimum cost index.

9 Claims, 3 Drawing Sheets

(58) Field of Classification Search
USPC .................................................. 73/112.01
See application file for complete search history.

(56) References Cited

U.S. PATENT DOCUMENTS

| | | | | |
|---|---|---|---|---|
| 7,379,799 B2* | 5/2008 | Cleary | ................... | G06N 7/005 |
| | | | | 340/425.5 |
| 7,472,100 B2* | 12/2008 | Volponi | ................ | G05B 17/02 |
| | | | | 706/45 |
| 7,702,435 B2* | 4/2010 | Pereira | ................ | G05B 13/042 |
| | | | | 701/30.8 |
| 7,822,512 B2* | 10/2010 | Thatcher | ................... | F02C 9/20 |
| | | | | 700/287 |
| 8,868,287 B2* | 10/2014 | Delaye | ............... | G05B 23/0283 |
| | | | | 701/29.3 |
| 9,037,381 B2* | 5/2015 | Care | ....................... | F01D 5/027 |
| | | | | 60/223 |
| 9,317,249 B2* | 4/2016 | Moeckly | .................... | G06F 7/00 |
| 2003/0074171 A1* | 4/2003 | Desai | .................... | G05B 17/02 |
| | | | | 703/8 |
| 2004/0243636 A1* | 12/2004 | Hasiewicz | ......... | G05B 23/0251 |
| 2006/0235707 A1* | 10/2006 | Goldstein | ........... | G05B 23/0283 |
| | | | | 702/182 |
| 2008/0243352 A1* | 10/2008 | Healy | .................... | F01D 17/00 |
| | | | | 701/100 |
| 2010/0161196 A1* | 6/2010 | Goericke | ........... | G05B 23/0283 |
| | | | | 701/99 |

\* cited by examiner

METHOD FOR DETECTING DETERIORATION IN A TURBOMACHINE BY MONITORING THE PERFORMANCE OF SAID TURBOMACHINE

GENERAL TECHNICAL FIELD AND PRIOR ART

The invention relates to the field of turbine engines, in particular to aircraft turbojet engines.

A turbojet engine conventionally comprises a plurality of modules such as a compressor, a combustion chamber and a turbine. During the operation thereof, these modules will degrade, thus affecting the performance of one or more modules of the turbojet engine. In the case of high degradation, the turbojet engine and the aircraft may be subject to malfunction in flight, known to a person skilled in the art by the term "in-flight shutdown" (IFSD), leading to unscheduled dismantling of the turbojet engine for a maintenance operation. These degradations are generally related to phenomena of fouling, corrosion, oxidation, erosion, abrasion or ingestion of a foreign body, etc.

To prevent the appearance of high degradation, operations for monitoring the turbojet engine are scheduled at regular time intervals. It is thus possible to detect whether one of the modules of the turbojet engine is defective or has symptoms which are a sign of future malfunction. Such a detection method is not satisfactory, since the wear on turbojet engines in the same family is variable, and monitoring at regular time intervals is not sufficient. If the frequency of monitoring is too low, the risk of in-flight malfunction (IFSD) is increased. By contrast, if the frequency of monitoring is too high, a monitoring step may be carried out while the engine is in perfect health, which results in time-wasting.

In order to eliminate this drawback, it has been proposed to monitor continuously, that is to say for each flight cycle of the aircraft, the individual performance of a turbojet engine in order to make an early detection of the appearance of abnormal degradation of the turbojet engine.

In the prior art, a method is known for detecting degradation for a turbojet engine in which use is made of a database of known degradation signatures that have been identified throughout the life of turbojet engines belonging to the same family. To form a signature, physical parameters of the turbine engine are measured, for example the fuel flow rate, the speed of the turbojet engine and the output temperature of the engine. In practice, the parameters measured by a turbine engine are few in number (fuel flow rate, running speed of the high-pressure body and temperature, which corresponds to the temperature of the exhaust gases) to provide monitoring of the various modules of the turbine engine. Consequently, it is difficult to be able to precisely target the module or modules causing the abnormal degradation of the performance level of the turbojet engine.

The application FR 1151348 by the company SNECMA discloses a method using a theoretical model of the thermodynamic cycle of said turbine engine in order to have a large number of degradation signatures. In practice, for a limited number of inputs of the model, it is possible to end up with several different thermodynamic configurations. Underdetermination of the problem to be solved does not make it possible to detect the condition of the modules of the turbine engine in an optimum manner.

Moreover, the detection methods according to the prior art do not take into account the aging of a turbine engine. As a result, the detection method may conclude that there is abnormal degradation of one of the modules of the turbine engine when the turbine engine has merely aged.

There is a need for a method for detecting degradation that distinguishes between deterioration related to the nominal aging of a turbine engine and deterioration related to abnormal degradation of an element.

GENERAL DESCRIPTION OF THE INVENTION

For this purpose, the invention relates to a method for detecting degradation of a turbine engine, by means of a computer, by monitoring the performance of said turbine engine, the turbine engine comprising a plurality of functional modules, each functional module being characterised by at least one health parameter representing degradation of the functional module of the turbine engine, the global aging of the turbine engine being characterised by an aging parameter, in which method:

a plurality of physical parameters of the turbine engine are measured in order to form a current performance index of the turbine engine;

a plurality of degraded performance indices of the turbine engine are calculated by means of a thermodynamic model of the turbine engine, assuming for each degraded performance index that only one functional module of the turbine engine has degraded, each degraded performance index being associated with a functional module;

each degraded performance index, corresponding to a single degraded functional module among all the functional modules of the turbine engine, is obtained by simulating a performance index of the turbine engine for which the health parameter of the degraded functional module and the aging parameter are variables, the health parameters of the other, non-degraded functional modules being considered to be healthy health parameters;

a plurality of cost indices are calculated, each cost index corresponding to the difference between the current performance index and a degraded performance index, varying the variables of the degraded performance index so that the difference is minimal, each degraded performance index being associated with its cost index;

the optimum cost index corresponding to the one with the lowest value among all the cost indices is determined;

degradation of the module of the turbine engine, the degraded performance index of which is associated with the optimum cost index, is detected.

The method according to the invention advantageously takes account of the aging of the turbine engine, thereby making it possible advantageously to distinguish a loss of performance related to the aging of the turbine engine from abnormal degradation. As the number of variables is limited by assuming that only one module is damaged, the decision of degradation is made quickly and reliably. The problem to be solved is no longer underdetermined as was the case in the prior art. The use of cost indices makes it possible to quickly and reliably validate the assumptions made regarding the degradation of the turbine engine.

Preferably, each functional module is characterised by at least two health parameters. Preferably, each functional module is characterised by an efficiency degradation indicator and a permeability/flow rate capacity degradation indicator. The efficiency and permeability/flow rate capacity indicators make it possible to precisely characterise a module of a turbine engine, in particular the type of degradation of the module. After the degraded module is detected, it is possible to analyse the optimised health parameters in order to determine the nature of the degradation, which makes it possible to carry out targeted maintenance.

More preferably, the functional modules belong to the following functional modules: a fan module, a high-pressure compressor module, a booster module, a high-pressure turbine module and a low-pressure turbine module. Such modules rarely exhibit abnormal degradation simultaneously, which makes it possible to validate the degradation assumptions of the degraded performance indices.

According to one aspect of the invention, the optimum cost index is compared with a cost threshold of a predetermined value and the detection of the degradation is inhibited if the optimum cost index is below the cost threshold. Advantageously, the risk of false detection is limited by adjusting the sensitivity of the detection. The lower the cost index, the more likely the degradation.

Preferably, a candidate cost index is determined, corresponding to the one with the lowest value among all the cost indices apart from the optimum cost index, the difference between the candidate cost index and the optimum cost index is compared with a given guard threshold, and degradation of the module of the turbine engine, the degraded performance index of which is associated with the candidate cost index, is detected if the difference is below the given guard threshold. In the event of a lack of decision, the method advantageously determines the two modules that are the most likely to cause the degradation, thereby increasing the detection rate.

More preferably, the values of the variables of the degraded performance index vary respectively over variation ranges of which the bounds are determined according to previously made degradation detections. Thus, combinations of unlikely parameters are not tested, which makes it possible to limit the computing time and improves the reliability of the method.

Still preferably, since each health parameter of a functional module is associated with an aging component that is dependent on the aging parameter, each degraded performance index depends on the aging components of all the modules. Thus, although it is assumed that a single module is faulty in the turbine engine, account is nevertheless taken of the aging of each module, thereby making it possible to obtain more relevant cost indices to improve the reliability of the decision.

Advantageously, a current signature of the turbine engine is compared with a library or database of signatures and, where applicable, any abnormality or abnormalities in the turbine engine are determined by means of a mathematical function. The library is to be kept informed with a feedback of experience, as will be explained in more detail hereinafter. This makes it possible to inform the library of new scenarios that arise in the course of the life of the turbine engines in the same fleet.

DESCRIPTION OF THE DRAWINGS

The invention will be better understood upon reading the following description which is given purely by way of example and with reference to the accompanying drawings, in which.

DESCRIPTION OF ONE OR MORE EMBODIMENTS

The invention will be described for a turbojet engine of an aircraft but the invention applies to any type of turbine engine such as an electricity-generating turbine engine.

Figure 1:
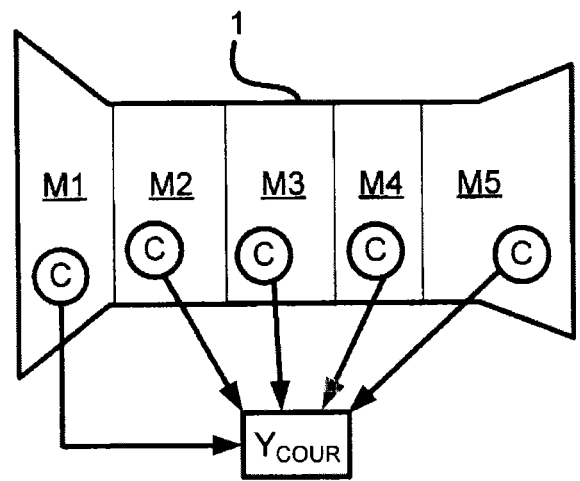
FIG. 1 is a schematic view of the modules of the turbojet engine and of the step of measuring physical parameters of the turbojet engine to calculate a current performance index of the turbojet engine during its flight.

With reference to FIG. 1, a turbojet engine 1 for an aircraft conventionally comprises a plurality of modules M such as a fan module M1, a high-pressure compressor module M2, a booster module M3, a high-pressure turbine module M4 and a low-pressure turbine module M5. Hereinafter, it is assumed that the turbojet engine 1 comprises only the five modules M1-M5 mentioned above, but it goes without saying that the invention applies to a turbojet engine 1 comprising more than five modules.

Performance Index of the Turbojet Engine

In order to make it possible to monitor the performance of a turbojet engine in the course of its life, a performance index Y is defined.

This performance index Y is conventionally obtained by calculation from a few measurements of physical parameters of the turbojet engine 1 in the course of its flights. By way of example, the turbojet engine comprises a plurality of sensors C arranged in the turbojet engine 1 in order to measure physical parameters such as temperature, pressure, fuel flow rate and rotation speeds.

The performance index Y may also be obtained analytically by means of a thermodynamic model of the turbojet engine that depends on:

global parameters of the turbojet engine 1 (flight conditions, operating values) and health parameters that are particular to the modules M1-M5 of the turbojet engine 1.

Preferably, the thermodynamic model of the turbojet engine 1 is in the form of an engine brochure. The brochure, better known as a "performance deck" or "engine cycle deck", defines the complete thermodynamic cycle of the turbojet engine and precisely defines each component of the turbojet engine. This brochure, which is well known to a person skilled in the art, allows engine manufacturers to test the turbojet engine 1 during its design before a prototype is constructed. The brochure is particular to each turbojet engine in the same family and of the same type. A brochure is conventionally drafted in accordance with the SAE Aerospace standards ARP755A and AS681G.

In this example, each module M has two health parameters:

an efficiency degradation indicator SE, and a permeability/flow rate capacity degradation indicator SW.

Unlike the global parameters, the health parameters of the modules M cannot be determined. It goes without saying that a module M may comprise a single health parameter or more than two health parameters.

In the present example, the performance index Y of the turbojet engine 1 depends on ten health parameters (two per module), which are listed in the following table.

TABLE 1

| health parameters of the performance index Y without aging | | | | |
| --- | --- | --- | --- | --- |
| M1 | M2 | M3 | M4 | M5 |
| SE1 | SE2 | SE3 | SE4 | SE5 |
| SW1 | SW2 | SW3 | SW4 | SW5 |

Such a definition of the performance index Y does not take into account the aging of the turbojet engine 1. In the course of the life of a turbojet engine 1, its performance will diminish, thereby resulting, at the global level, in a change over time in its performance index Y and, at the module level, in a change over time of the health parameters SE, SW.

For this purpose, the health parameters SE, SW are broken down into an aging component $F_{SE}(\lambda)$, $F_{SW}(\lambda)$ and an abnormality component $\Delta SE$, $\Delta SW$.

In other words, for each functional module M of the turbojet engine 1, the health parameters SE, SW are defined as follows:

$$SE = F_{SE}(\lambda) + \Delta SE$$

$$SW = F_{SW}(\lambda) + \Delta SW$$

The aging component $F_{SE}(\lambda)$, $F_{SW}(\lambda)$ depends on a global aging level $\lambda$ that is defined globally for the turbojet engine 1. The aging functions $F_{SE}$ and $F_{SW}$ for their part are known or can be determined by means of aging models. These aging models are established from a degradation matrix obtained from engine tests and feedback of experience regarding the use of engines in operation. The degradation matrices represent the change in the performance of the modules of the turbojet engine between a new condition and a deteriorated condition. Feedback from engines in operation makes it possible to readjust the change in performance of the modules.

As a result, for a functional module M of the turbojet engine 1, only the parameters $\Delta SE$, $\Delta SW$ and $\lambda$ are unknown. As $\lambda$ is a global parameter of the turbojet engine 1, the performance index Y of the turbojet engine 1 is dependent on the following eleven health parameters.

TABLE 2

| health parameters of the performance index Y with aging | | | | | |
| --- | --- | --- | --- | --- | --- |
| M1 | M2 | M3 | M4 | M5 | |
| $\Delta SE1$ | $\Delta SE2$ | $\Delta SE3$ | $\Delta SE4$ | $\Delta SE5$ | $\lambda$ |
| $\Delta SW1$ | $\Delta SW2$ | $\Delta SW3$ | $\Delta SW4$ | $\Delta SW5$ | |

With reference to FIG. 1, by means of all the sensors C arranged on the turbojet engine 1, it is possible to globally measure the current performance index $Y_{COUR}$ of the turbojet engine 1 in the course of its life. Unfortunately, if a loss of performance is detected, it is not possible to know the cause thereof (age, degradation, etc.). The current performance index $Y_{COUR}$ is dependent on eleven health parameters and, taking into account the lack of instrumentation, an analytical solution is not possible for determining the contribution of each parameter to the loss of performance.

Analysis of the Performance of a Module of the Turbojet Engine

The method for detecting degradation by analysing performance is implemented by a computer in a maintenance system, preferably on the ground. Some data are acquired during flight and stored in an onboard computer before being transmitted to the maintenance system on the ground.

According to the invention, a current performance index $Y_{COUR}$ of the turbojet engine 1 is first of all calculated by measuring a plurality of physical parameters as shown in FIG. 1, for example the temperature, pressure, fuel flow rate and rotation speed. These physical parameters are standardised in advance so as to eliminate the impact of the variability of the operating conditions and thus to be able to make a consistent comparison with the change in the physical parameters over time.

Figure 2:
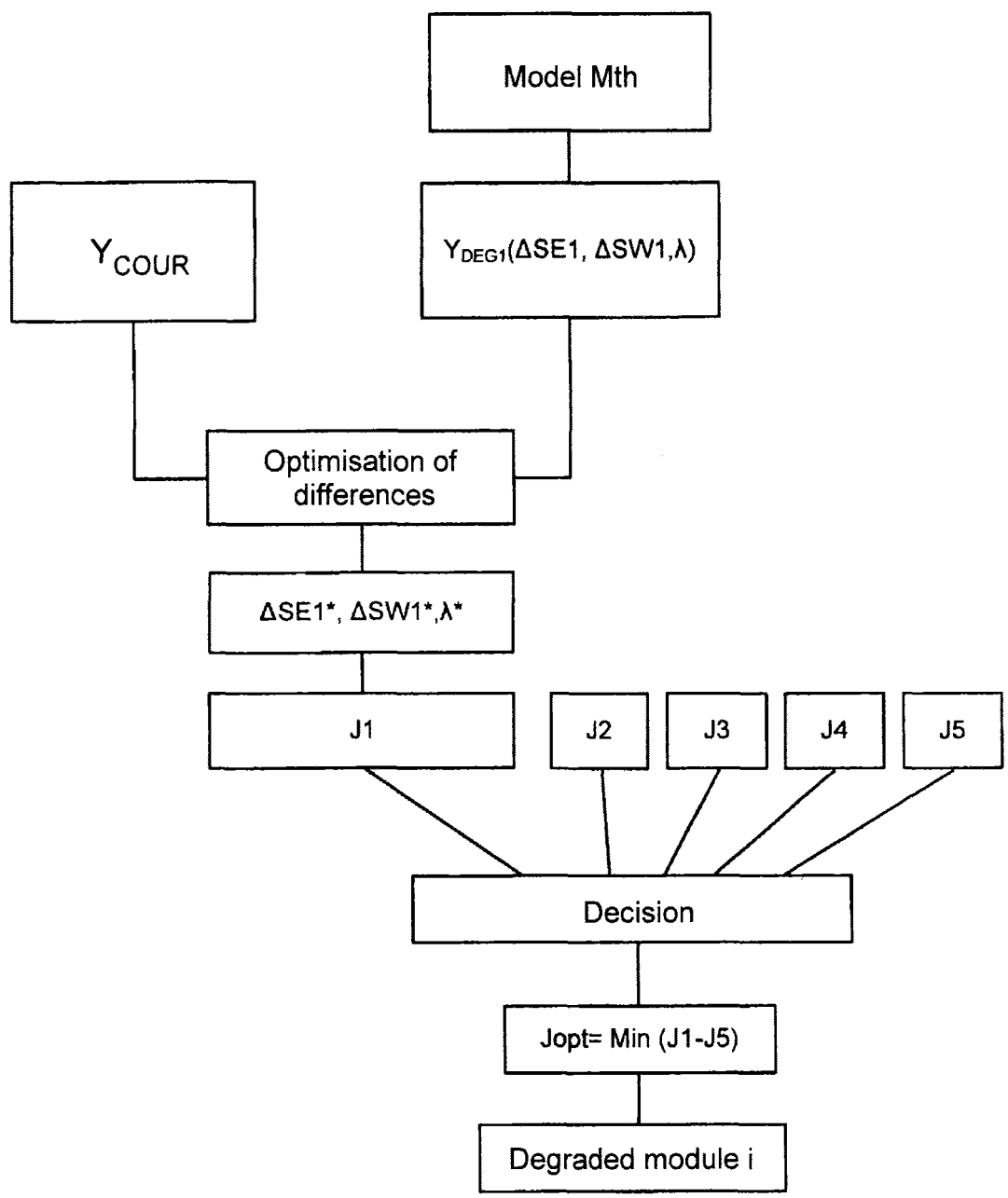
FIG. 2 shows the monitoring of the cost indices J2, J3, J4 and |J4−J2|, which are characteristic of degradation of the modules M2, M3 and M4.

With reference to FIG. 2, degraded performance indices $Y_{DEG1}$-$Y_{DEG5}$ of the turbojet engine 1 are then calculated by means of a thermodynamic model Mth of the turbojet engine 1, as defined previously, which is dependent on global parameters and health parameters that are particular to the functional modules M1-M5 of the turbojet engine 1 and are unknown ($\Delta SE1$-$\Delta SE5$, $\Delta SW1$-$\Delta SW5$, $\lambda$).

Each degraded performance index $Y_{DEG1}$-$Y_{DEG5}$ is calculated on the assumption that only one functional module M of the turbojet engine 1 has degraded, each degraded performance index $Y_{DEG1}$-$Y_{DEG5}$ being associated with a given functional module M1-M5. By way of example, the degraded performance index $Y_{DEG1}$ is calculated on the assumption that only the module M1 of the turbojet engine 1 has degraded. As a result, the following health parameters $\Delta SE2$-$\Delta SE5$ and $\Delta SW2$-$\Delta SW5$ are null and void because the modules M2-M5 are healthy, that is to say non-degraded. Thus, with reference to FIG. 2, the degraded performance index $Y_{DEG1}$ is dependent on only three unknown parameters: $\Delta SE1$, $\Delta SW1$ and $\lambda$.

If the same reasoning is applied for all the degraded performance indices $Y_{DEG1}$-$Y_{DEG5}$, each degraded performance index $Y_{DEGi}$ is dependent on the variables ($\Delta SEi$, $\Delta SWi$, $\lambda$) and the following indices are obtained:

$Y_{DEG1}(\Delta SE1, \Delta SW1, \lambda)$;
$Y_{DEG2}(\Delta SE2, \Delta SW2, \lambda)$;
$Y_{DEG3}(\Delta SE3, \Delta SW3, \lambda)$;
$Y_{DEG4}(\Delta SE4, \Delta SW4, \lambda)$; and
$Y_{DEG5}(\Delta SE5, \Delta SW5, \lambda)$.

Each degraded performance index $Y_{DEG1}$-$Y_{DEG5}$ is characteristic of damage to a single given module of the turbojet engine 1.

Advantageously, each degraded performance index $Y_{DEG1}$-$Y_{DEG5}$ takes account of the aging of the turbojet engine 1 of each of the modules M1-M5. Thus, for the degraded performance index $Y_{DEG1}$, the health parameters of the modules M2-M5 take account of the aging components $F_{SE}(\lambda)$, $F_{SW}(\lambda)$.

Cost Index

According to the invention, each degraded performance index $Y_{DEG1}$ is compared with the current performance index $Y_{COUR}$. As the degraded performance index $Y_{DEGi}$ is dependent on the variables ($\Delta SEi$, $\Delta SWi$, $\lambda$), this comparison is parametric. In this example, the parameters of the degraded performance index $Y_{DEGi}$ are optimised in order to limit the differences between the performance indices $Y_{DEGi}$, $Y_{COUR}$.

Hereinafter, the minimum difference between a degraded performance index $Y_{DEG1}$ and the current performance index $Y_{COUR}$ is referred to as the cost index $J_i$. This minimum difference is obtained for an optimised combination of parameters $\Delta SEi^*$, $\Delta SWi$, $\lambda^*$ for the degraded performance index $Y_{DEGi}$ as shown in FIG. 2.

This cost index $J_i$, which is obtained for the optimised combination of parameters $\Delta SEi^*$, $\Delta SWi^*$, $\lambda^*$, makes it possible to get as close as possible to the current performance index $Y_{COUR}$ when it is assumed that the module Mi is the only one which is degraded. Thus, the lower the cost index $J_i$, the more likely the degradation of the module Mi of the turbojet engine 1.

In order to calculate the minimum value of each cost index $J_i$, the parameters ΔSEi, ΔSWi and λ are varied. Preferably, the changes in the parameters (ΔSEi, ΔSWi, λ) are placed under constraints. In this example, the parameters (ΔSEi, ΔSWi, λ) vary over variation ranges of which the bounds are determined according to detections of degradations that previously occurred on the turbojet engine 1. Thus, a turbojet engine 1 cannot "rejuvenate" from one flight to another (λ is necessarily increasing). Likewise, the efficiency of a module Mi cannot improve over time (ΔSEi is necessarily increasing). As each cost index $J_i$ is dependent on only three unknown parameters (ΔSEi, ΔSWi, λ), it is simple to achieve a unique digital optimisation. The greater the number of parameters, the greater the number of possible solutions, which prevents reliable decision making.

By way of example, the cost index $J_i$ for a module $M_i$ is calculated from the following formula:

$$J_i = \sqrt{\frac{1}{N}\sum_{k}^{N}\left(\frac{Y_{k,i} - Y_{k,COUR}}{\sigma_k}\right)^2}$$

A formula in which:
$Y_{k,i}$ corresponds to the degraded performance index of a degradation of a module i observed for the component of the module k of a turbojet engine comprising N modules;
$Y_{k,COUR}$ corresponds to the current performance index for the component of the module k of the turbojet engine;
$\sigma_k$ corresponds to the measurement uncertainties on the various performance indices.

It goes without saying that other cost functions could be used for measuring the likelihood of the assumption made regarding the state of health of a module of the turbojet engine.

During this approximation by least squares, a value of the optimised aging parameter λ* is determined for each cost index $J_i$. As the health parameters SE, SW of the modules M1-M5 are also dependent on an aging component $F_{SE}(\lambda^*)$, $F_{SW}(\lambda^*)$ as a function of λ*, the result is that the performance index of each healthy module $Y_{k,i}$ is also modified when the cost index $J_i$ is calculated for a given degraded module Mi. In other words, even if the modules Mi are considered to be healthy, account is taken of their aging in order to calculate the degraded performance indices.

Determining Degradation of a Module

With reference to FIG. 2, once all the combinations have been tested, a plurality of cost indices $J_i$ are obtained which are each associated with a set of optimised parameters (ΔSEi*, ΔSWi*, λ*). In this example, five cost indices $J_1$-$J_5$ are obtained, each cost index representing the likelihood of the assumption made regarding the degradation of a module Mi of the turbojet engine 1.

Thus, the lower the cost index $J_i$, the greater the probability that the module Mi is a degraded module.

According to the invention, with reference to FIG. 2, degradation is detected by selecting the cost index with the lowest value, referred to as the optimum cost index $J_{opt}$. This is the closest to the current performance index $Y_{COUR}$ and has the most chance of corresponding to the observed degradation.

In order to limit the risk of false detection, steps of consolidating the degradation decision are implemented.

Figure 3:
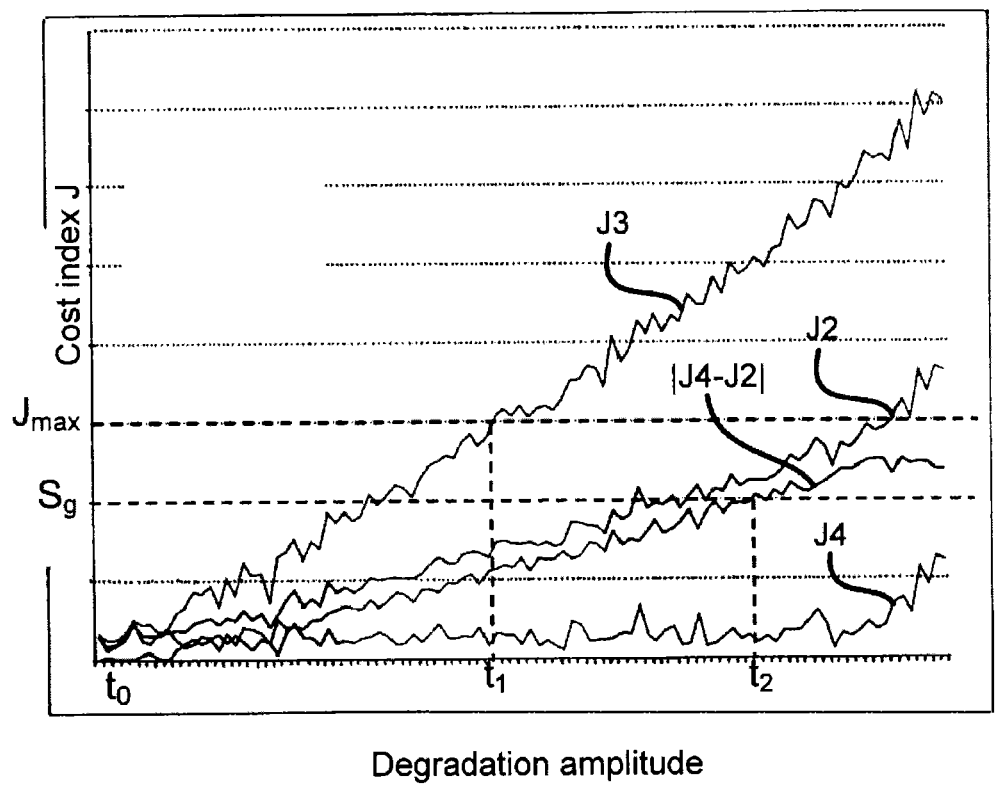
FIG. 3 is a schematic diagram of the detection method according to the invention.

As shown in FIG. 3, the change in the three cost indices $J_2$-$J_4$ is monitored according to the level of degradation of the turbojet engine 1, which is a function of time.

In order to limit the risk of false detection, in a first embodiment of the invention, only the cost indices J below a cost threshold $J_{max}$ are taken into account for selection. Preferably, the cost threshold $J_{max}$ is a parameterisable threshold that is defined empirically here according to the desired sensitivity. The higher the cost index J, the less likely the degradation. With reference to FIG. 3, the cost indices J2, J3 and J4 are below the cost threshold $J_{max}$ over $t_0$-$t_1$. All the cost indices J2, J3 and J4 can therefore be selected to detect the optimum cost index $J_{opt}$. By contrast, the cost index J3 is higher than the cost threshold $J_{max}$ over $t_1$-$t_2$, thereby limiting the choice solely to the cost indices J2 and J4. By limiting the number of cost indices taken into account, the selection of the optimum cost index $J_{opt}$ is accelerated, which is advantageous.

In a second embodiment of the invention, the value of the optimum cost index $J_{opt}$ and the value of the candidate cost index $J_{cand}$ corresponding to the one with the lowest value among all the cost indices J1-J5 apart from the optimum cost index $J_{opt}$ are compared. In this example, the optimum cost index $J_{opt}$ is J4 and the candidate cost index $J_{cand}$ J2. The difference between the candidate cost index $J_{cand}$ and the optimum cost index $J_{opt}$ is compared with a guard threshold of a given value $S_g$ and the best two indices are returned if the difference is less than the guard threshold $S_g$. The discrimination is not considered to be sufficiently reliable to determine with certainty the module which is the cause of the observed degradation. The risk of false detection is thus limited.

With reference to FIG. 3, the difference |J4−J2| is shown and compared with the guard threshold $S_g$. Over the range $t_0$-$t_2$, the difference |J4−J2| is below the guard threshold $S_g$ and the two solutions M2 and M4 are returned. As shown in FIG. 3, the values J2 and J4 are very close to each other over the range $t_0$-$t_2$ and it is difficult to make a decision as to the exact cause of the observed degradation. From the time $t_2$, the difference |J2−J4| exceeds the guard threshold $S_g$ and a reliable decision can be made to declare degradation of the module M4.

When a decision is made on one or two damaged modules, maintenance operations can be performed on these modules in a localised manner before major degradation of the turbojet engine 1 occurs. This method makes it possible to limit the maintenance operations solely to the affected modules, thereby making it possible to achieve savings and to limit the maintenance time. Furthermore, the repair is carried out early on, which allows airlines to have operational aircraft available continuously.

Figure 4:
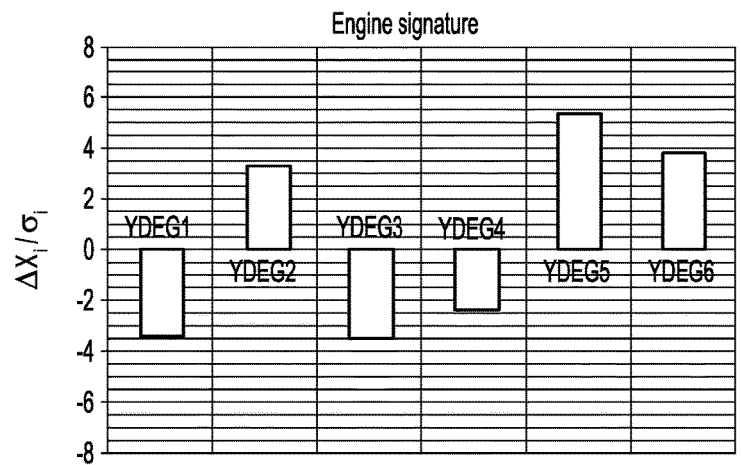
FIG. 4 is a graph showing a current signature of a turbine engine.
Figure 5:
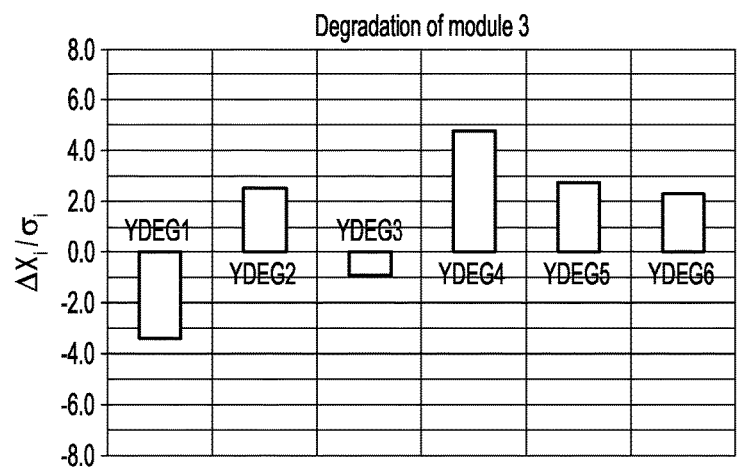
FIG. 5 shows graphs of a library of turbine engine signatures.
Figure 5:
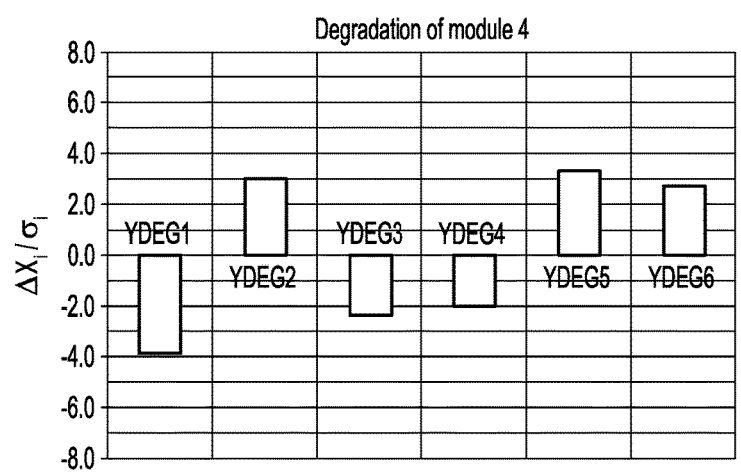

FIGS. 4 and 5 show an advantageous step of the method according to the invention, in which a current signature of the turbine engine is compared with a library of signatures and where applicable one or more abnormalities of the turbine engine are determined by means of a mathematical function. FIG. 4 shows an example of a current signature of a turbine engine. This signature is obtained by measuring physical parameters or indicators of the turbine engine. FIG. 5 shows an example of a library of signatures, the first graph being a signature obtained when degradation of the efficiency of the module M3 affects the turbine engine, and the second graph being a signature obtained when degradation of the efficiency of the module M4 occurs. A suitable mathematical classification function makes it possible, using the library of signatures (combination of indicators) to indicate at least one abnormality in the turbine engine, using its current signature. The signatures are compared in terms of co-linearity (form/direction of variation of the indicators) and amplitudes. The combination of these elements gives a probability. The library of signatures is to be indicated with the feedback of experience (events encountered in operation) of a fleet of turbine engines. In the example shown, the signature in FIG. 4 is compared with those in FIG. 5 and the function gives a probability of 97% for the module M3 compared with 52% for the module M4. This means that the turbine engine has a signature indicating that its module M4 is exhibiting degradation of its efficiency.

The invention claimed is:

1. A method for detecting degradation of a turbine engine, by a computer, by monitoring a performance of the turbine engine, the turbine engine including a plurality of functional modules, each functional module being characterised by at least one health parameter representing degradation of the functional module of the turbine engine, global aging of the turbine engine being characterised by an aging parameter, the method comprising:

measuring a plurality of physical parameters of the turbine engine to form a current performance index of the turbine engine;

calculating a plurality of degraded performance indices of the turbine engine by a thermodynamic model of the turbine engine, assuming for each degraded performance index that only one functional module of the turbine engine has degraded, each degraded performance index being associated with a functional module;

obtaining each degraded performance index, corresponding to a single degraded functional module among all the functional modules of the turbine engine, by simulating a performance index of the turbine engine for which the health parameter of the degraded functional module and the aging parameter are variables, the health parameters of the other, non-degraded functional modules being considered to be healthy health parameters;

calculating a plurality of cost indices, each cost index corresponding to the difference between the current performance index and each degraded performance index, varying the variables of the degraded performance index so that the difference is minimal, each degraded performance index being associated with its cost index;

determining an optimum cost index corresponding to the one with the lowest value among all the cost indices;

detecting degradation of the module of the turbine engine, the degraded performance index of which is associated with the optimum cost index.

2. A method according to claim 1, wherein each functional module is characterised by at least two health parameters.

3. A method according to claim 2, wherein each functional module is characterised by:

an efficiency degradation indicator, and a permeability/flow rate capacity degradation indicator.

4. A method according to claim 1, wherein the functional modules belong to the following functional modules: a fan module, a high-pressure compressor module, a booster module, a high-pressure turbine module, and a low-pressure turbine module.

5. A method according to claim 1, wherein:

the optimum cost index is compared with a cost threshold having a predetermined value, and the detection of the degradation is inhibited if the optimum cost index is below the cost threshold.

6. A method according to claim 1, wherein:

a candidate cost index corresponding to the one with the lowest value among all the cost indices apart from the optimum cost index is determined;

the difference between the candidate cost index and the optimum cost index is compared with a given guard threshold; and degradation of the module of the turbine engine, the degraded performance index of which is associated with the candidate cost index, is detected if the difference is below the given guard threshold.

7. A method according to claim 1, wherein the value of the variables of the degraded performance index varies respectively over variation ranges of which bounds are determined according to degradation detections previously made.

8. A method according to claim 1, wherein, each health parameter of a functional module is associated with an aging component that is dependent on the aging parameter, and each degraded performance index is a function of the aging components of all the modules.

9. A method according to claim 1, wherein a current signature of the turbine engine is compared with a library of signatures, and wherein any abnormality or abnormalities in the turbine engine are determined by a mathematical function.

* * * * *